United States Patent
Liang

Patent Number: 5,862,702
Date of Patent: Jan. 26, 1999

[54] SEALING ASSEMBLY FOR THE SENSING PROBE OF A LEVEL DETECTOR

[76] Inventor: Chung-Ho Liang, No. 6, Lane 40, Chung-Hsin Rd. Sec. 2, Wu-Ku Hsiang, Taipei Hsien, Taiwan

[21] Appl. No.: 882,944

[22] Filed: Jun. 26, 1997

[51] Int. Cl.$^6$ .............................. H01H 36/02; G01F 23/72
[52] U.S. Cl. .......................... 73/313; 73/319; 73/DIG. 5; 200/84 C
[58] Field of Search ....................... 73/313, 319, DIG. 5; 227/606, 609, 621, 622, 623, 640

[56] References Cited

U.S. PATENT DOCUMENTS

| | | | |
|---|---|---|---|
| 2,484,690 | 10/1949 | De Giers | 73/313 X |
| 3,678,750 | 7/1972 | DiNoia et al. | 73/313 |
| 3,685,357 | 8/1972 | Alexander | 73/313 |
| 4,056,979 | 11/1977 | Bongort et al. | 73/313 |

*Primary Examiner*—Richard Chilcot
*Assistant Examiner*—Willie Morris Worth
*Attorney, Agent, or Firm*—Bacon & Thomas, PLLC

[57] ABSTRACT

Both ends of a sensing probe are sealed by an assembly including a fixing disk, a sensing probe, a sensing circuit, a floating collar and an external tube is provided. The fixing disk is provided with a threaded opening in which one end of the sensing probe is fixedly attached. The sensing probe is built-in with a sensing circuit. A floating collar is movably enveloped onto the sensing probe. The external tube is further attached to the fixing disk and the inner diameter of the external tube is larger than the outer diameter of the floating collar. The other end of the sensing probe is provided with an inner threaded portion. A locking cover is provided with a pair of openings and a post in a central portion. The post is provided with an external threaded portion in which the inner threaded portion of the sensing probe can be engaged. The post further includes a threaded recess in which a bolt having a small collar can be attached. The fixing disk further includes an annular extension at its bottom. A larger ring is disposed within the annular extension. The lower portion of the annular extension is provided with an inner threaded portion and the locking ring is provided with an external threaded portion such that the larger ring can be compressed when the later is locked up. By this arrangement, the sensing probe is completely sealed at both ends.

3 Claims, 5 Drawing Sheets ns assembly for a sensing probe of a level detector

SEALING ASSEMBLY FOR THE SENSING PROBE OF A LEVEL DETECTOR

FIELD OF THE INVENTION

The present invention relates to sealing assembly, more particularly, to a sealing assembly for a sensing probe of a level detector in which the sensing probe is completely sealed from top to bottom and this sensing probe can be used to detect the level of liquid in any device.

DESCRIPTION OF THE DRAWING

In the conventional level detector, the sensing probe is sealed at least by one or more O-rings and a plug. If the O-ring is contaminated by debris or small particulate during the assembling process, an incomplete seal will be experienced. Even though tightening by screwing can be done, the slit between the threaded portions is also inevitable. On the other hand, the O-ring is generally made from rubber material which is extremely sensitive to the variation of temperature. The O-ring will become softer as in hot weather condition, while it becomes harden as the O-ring is exposed cold weather conditions. When the O-ring becomes harden when exposed to cold weather condition, the O-ring tends to crack and a leakage will be experienced. As a result, the sensing circuit within the sensing probe will be negatively influenced. Once the sensing circuit is contacted with water or other liquid, a malfunction will result.

On the other hand, two types of plugs have been introduced.

SUMMARY OF THE INVENTION

It is the objective of this invention to provide a sealing assembly wherein the sensing probe is provided with a sealing mechanism which can be quickly and tightly sealed. Furthermore, this sealing assembly is not sensitive to the variation of temperature.

It is still the objective of this invention to provide a sealing assembly for a sensing probe wherein a quick connecting mechanism is provided such that the tube can be readily sealed and the sealing engagement will not be influenced by the variation of weather conditions. Furthermore, a fixedly locking effect can be attained between the sensing probe and the fixing connector.

A sealing assembly for a sensing probe of a level detector comprising a fixing disk, a sensing probe, a sensing circuit, a floating collar and an external tube is provided. The fixing disk is provided with a threaded opening in which the one end of the sensing probe is fixedly attached. The sensing probe is built-in with a sensing circuit. A floating collar is movably enveloped onto the sensing probe. The external tube is further attached to the fixing disk and the inner diameter of the external tube is larger than the outer diameter of the floating collar. The other end of the sensing probe is provided with an inner threaded portion. A locking cover is further provided and includes a pair of openings and a post in the central portion. The post is provided with an external threaded portion in which the inner threaded portion of the sensing probe can be engaged. The post further includes a threaded recess in which a bolt having a small collar enveloped thereof can be attached thereof. The fixing disk further includes an annular extension at the bottom. A larger ring is disposed within the annular extension. The lower portion of the annular extension is provided with an inner threaded portion and the locking ring is provided with an external threaded portion such that the larger ring can be compressed when the latter is locked up. By this arrangement, the sensing probe is completely sealed at both ends.

BRIEF DESCRIPTION OF DRAWINGS

Figure 1:
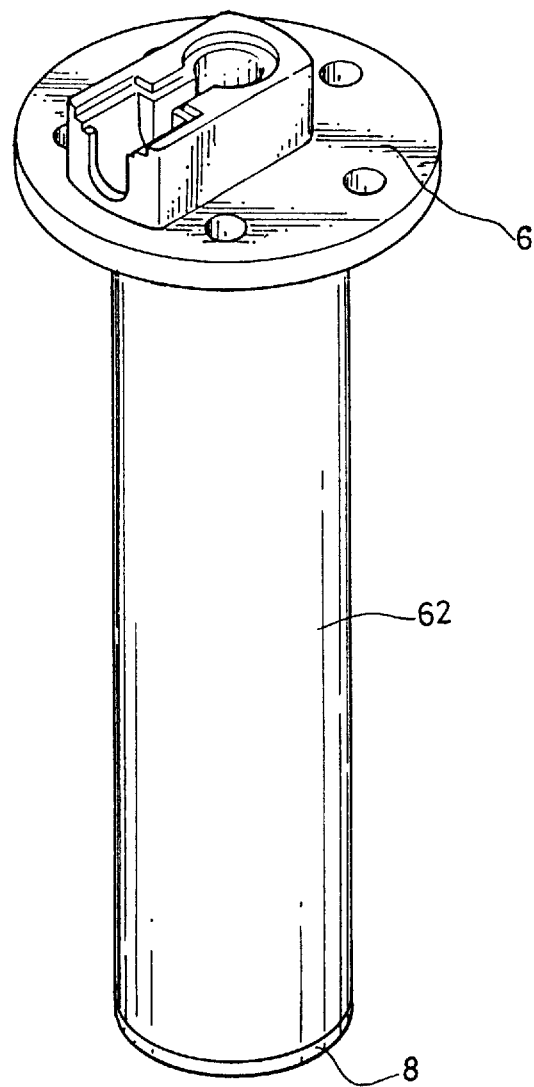
Figures 2, 2A:
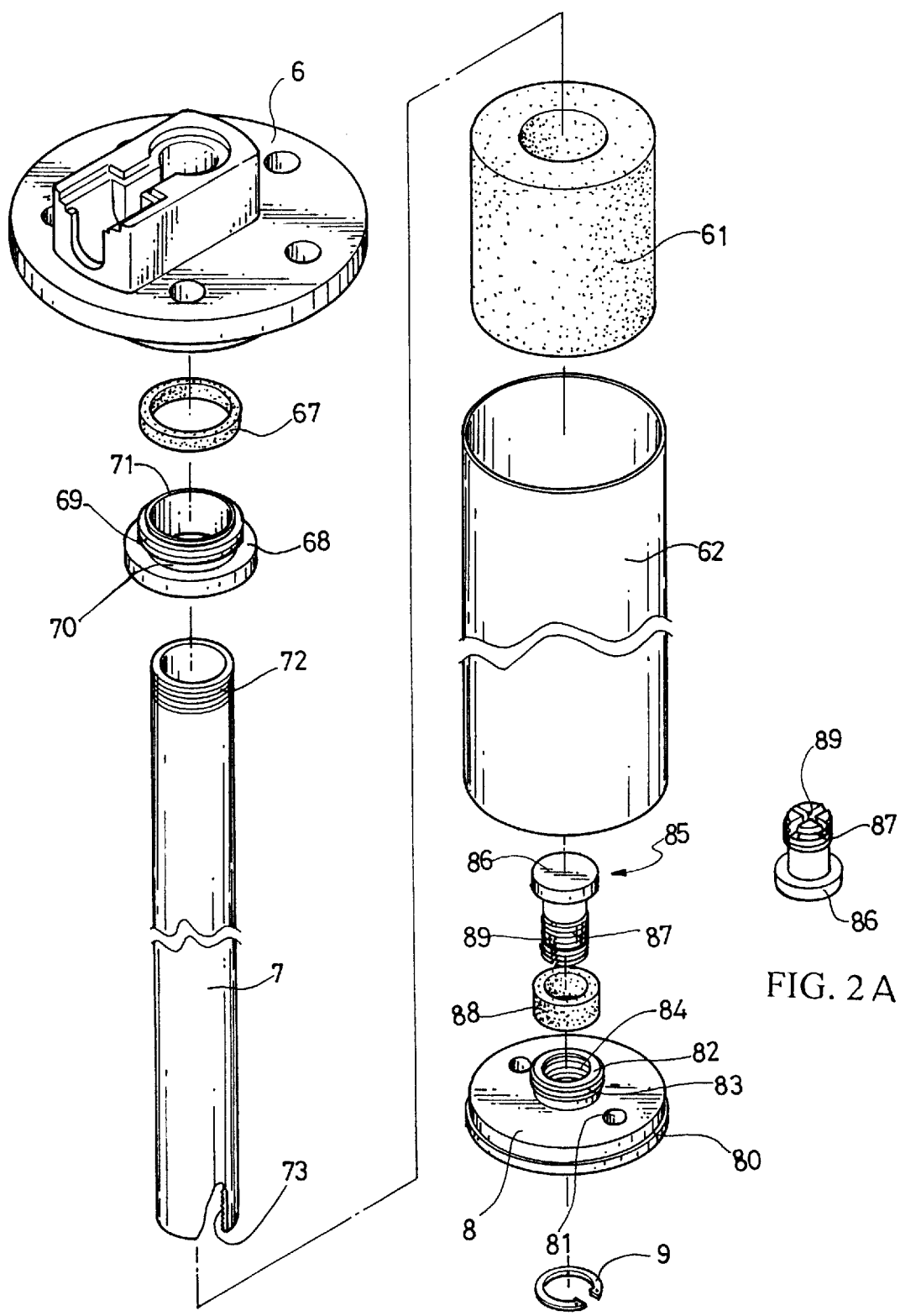
Figure 3:
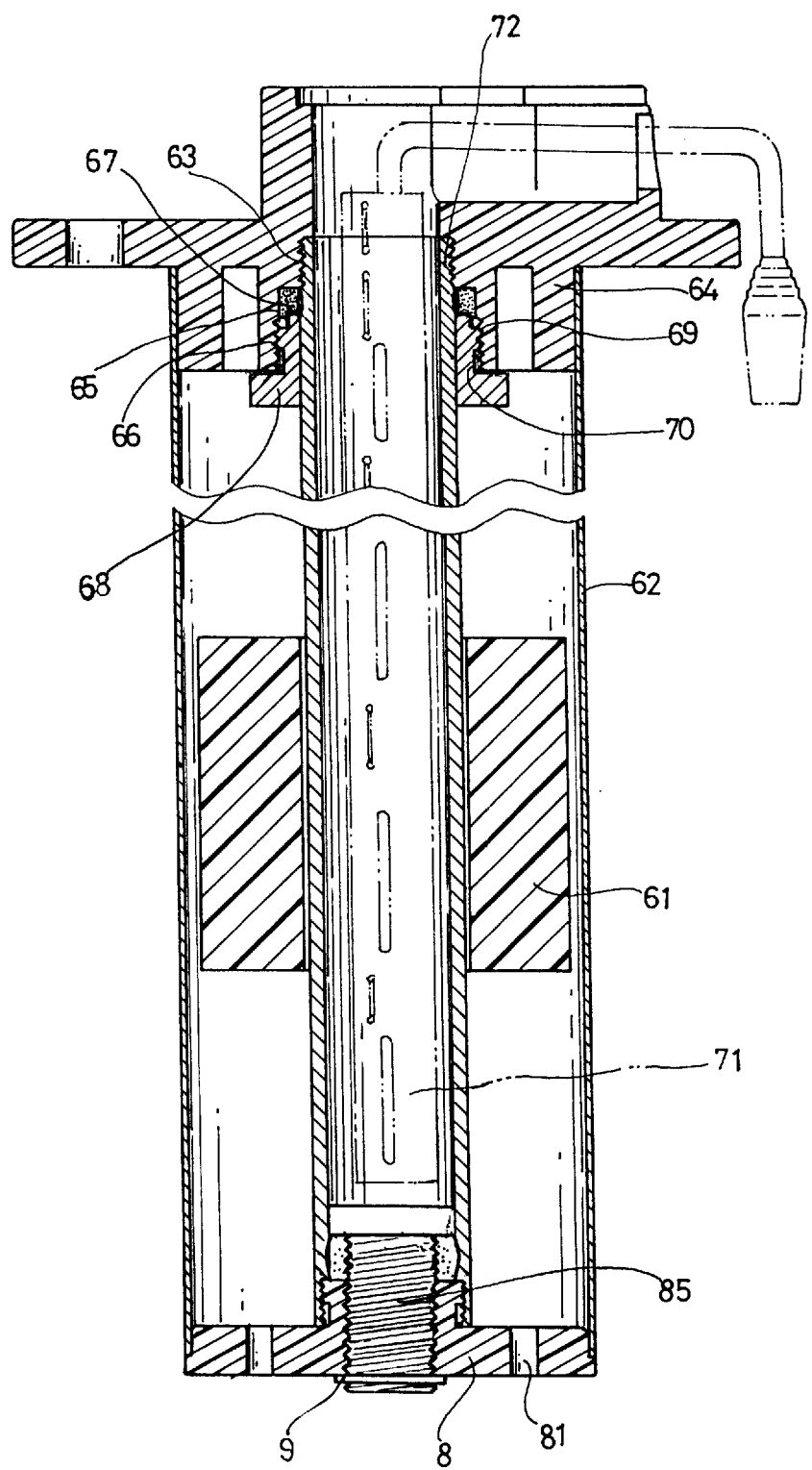
Figure 4:
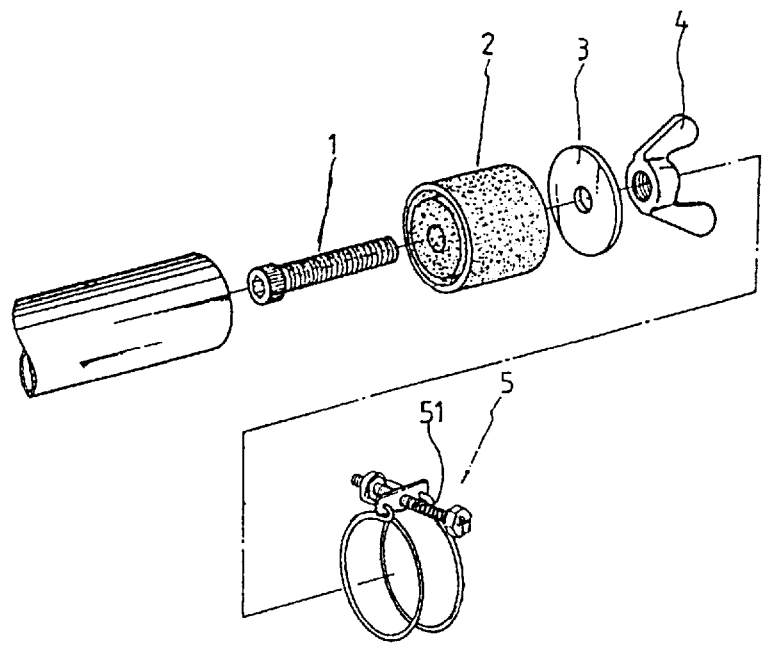
As shown in FIGS. 4 and 5, the expansion type plug is shown. This plug generally comprises a bolt 1, a plug body 2 having a passage, a washer 3, a wing nut 4, and a clipper 5. The plug body 2 corresponds to the inner diameter of a tube for recieving the plug body 2. In assembly, the bolt 1 is inserted through the central passage of the plug body 2 and the washer 3 and wing nut 4 are applied to lock up such that the plug body 2 is compressed and expanded. However, since a clipper 5 having a locking bolt 51 shall be enveloped onto the tube to ensure a leakage-proof seal between the tube and the plug body 2, this is really inconvenient in mounting.
Figure 5:
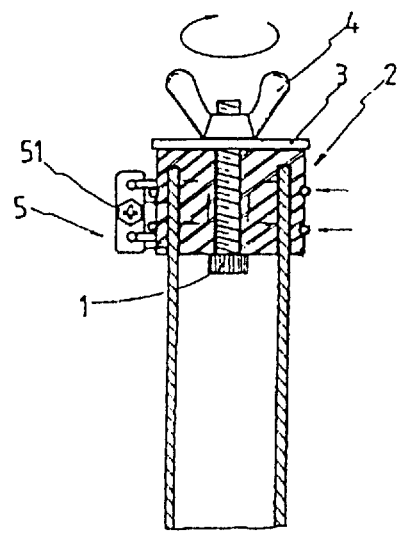
Figure 8:
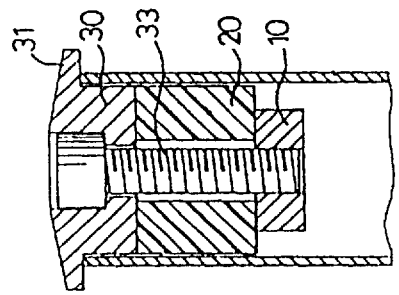
Figure 7:
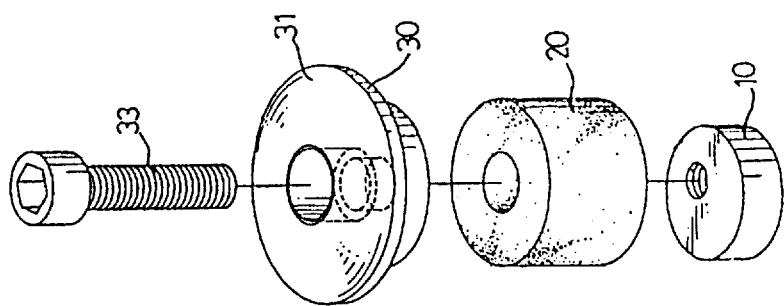
FIGS. 6 and 7 show another type of plug. This plug generally comprises a bolt 33, a collar 20, a plug cover 30, and an eccentric collar 10. The bolt 33 is locked into the eccentric collar 10 which has a threaded opening thereof. The flange 31 of the plug cover 30 is sealed onto the opening of the tube. However, even the eccentric collar provides a mounting for the bolt 33, as the eccentric collar lacks of footing, the eccentric collar will still rotate with the bolt 33. In light of this, it is hard to get a lock-up engagement between the eccentric collar and the bolt. As a result, the collar 20 cannot be further compressed to expand and the complete sealing is unrealized. As a matter of fact, there is still a need to provide an improved sealing mechanism.
Figure 6:
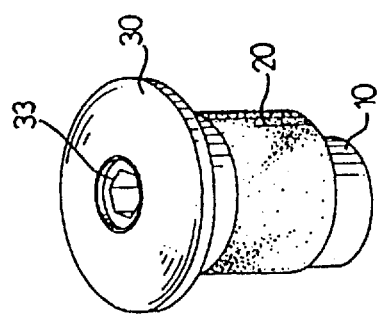

In order that the present invention may more readily be understood the following description is given, merely by way of example with reference to the accompanying drawings, in which:

FIG. 1 is a perspective view of the sealing assembly made according to the present invention;

FIG. 2 is an exploded perspective view of the sealing assembly according to the present invention;

FIG. 2A is a perspective view in which the bolt is disposed at the other side;

FIG. 3 is a cross sectional view showing the sealing assembly is assembled to a tube;

FIG. 4 is a perspective view of a conventional sealing assembly;

FIG. 5 is cross sectional view of the sealing assembly shown in FIG. 4;

FIG. 6 is a perspective view of a second conventional sealing assembly;

FIG. 7 is an exploded perspective view of the sealing assembly shown in FIG. 6; and FIG. 8 is cross sectional view of the sealing assembly shown in FIG. 6.

DETAILED DESCRIPTION OF PREFERRED EMBODIMENT

Referring to FIGS. 1 to 3, the sealing assembly for a sensing probe of a level detector made according to the present invention generally comprises a fixing disk 6, a sensing probe 7, a sensing circuit 71, a floating collar 61 and an external tube 62.

The fixing disk 6 is provided with a threaded opening 63 in which the sensing probe 7 can be fixedly locked thereto by means of the threaded portion 72 thereof. The sensing probe 7 is built-in with a sensing circuit 71 and the floating collar 61 is movably enveloped onto the sensing probe 7. The floating collar 61 is disposed with a magnet and when the floating collar 61 is moved along the sensing probe 7, the positioning of the floating collar 61 can be readily detected and positioned by the sensing circuit 71. As a result, the level of liquid can be readily detected via the movement of the floating collar 61. As a result, this sensing probe 7 can be readily applied for detecting the liquid level within a fuel tank, fuel container, and manure pit (for household, vehicle or other transportation). The fixing disk 6 is provided with a retaining socket 64 to which an external tube 62 having a larger diameter can be attached.

The other layer end of the sensing probe 7 is provided with an inner threaded portion 73 in which a locking cover 8 can be sealed thereof. The locking cover 8 is provided with a pair of openings 81 which provide a fluid communication between the interior and exterior of tube 62. As a result, the fluid may flow in/out the external tube 62 through the openings of the locking cover 8. The locking cover 8 is further provided with a post 82. The post 82 is provided with a threaded recess 84 in which the lower end of the sensing probe 7 can be engaged for securing probe 7 to cover 8. The peripheral of the locking cover 8 forms a shoulder 80 for engaging with the external tube 62. The inner threaded recess 84 of the post 82 can be engaged by a bolt 85. A small collar 88 can be disposed between the bolt head 86 and the threaded portion 87. The bolt 85 is provided with a slit 89 for engaging with a screw driver thereof. As a result, the bolt 85 can be locked to the post 82. Once the bolt 85 is locked, the small collar 88 will be compressed to circumferentially expand. As a result, the enlarged small collar 88 will establish a tight engagement with the inner wall of the sensing probe 7. The bolt 85 is extended over the locking cover 8 and a thin clipping ring 9 can be fixedly attached to the threaded portion of the bolt 85 such that the enlarged small collar 88 will not resume to its original shape. The clipping ring 9 can also be replaced by means of glue or other suitable means.

As clearly shown in FIG. 3, the fixing disk 6 is provided with an annular extension 65 in the area adjacent to the sensing probe 7. The external half of the annular extension 65 has an inner threaded portion 66 and the inner half of the annular extension 65 is used to receive a larger ring 67. A locking ring 68 can be attached to the inner threaded portion 66 of the annular extension 65. The locking ring 68 has a reduced diameter portion 69 which has an external threading 70. The reduced threaded portion 69 of the locking ring 68 can be engaged with the inner threaded portion 66 of the annular extension 65. When the locking ring 68 is locked up, the larger ring 67 can be compressed to circumferentially expand such that a tight engagement between the larger ring 67 and the sensing probe 7 can be attained. The length of the reduced external diameter 69 of the locking ring 68 is longer then the depth of the annular extension 65, by this arrangement, the larger ring 67 can be effectively compressed.

From the forgoing description, the sealing assembly features dual sealing functions effected by the enlarged small collar 88 and the enlarged larger ring 67, as a result, the sensing probe 7 can be effectively sealed at both ends. By this arrangement, the liquid to be sensed will not penetrate into the sensing probe, accordingly, the built-in sensing circuit will not malfunction or caused to be damaged. On the other hand, the assembling of those components can also be effectively and easily performed.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. In a level detector having an external tube enclosing a sensing probe containing a sensing circuit and a floating collar surrounding the probe for movement in response to fluid admitted within the external tube, a sealing assembly comprising:

a) a fixing disk including a retaining socket for engagement by an end of the external tube, a threaded opening and an internally threaded annular extension;

b) a sensing probe including an externally threaded first end and an internally threaded second end, the externally threaded first end in threaded engagement with the threaded opening of the fixing disk;

c) a first compressible ring surrounding the probe adjacent the externally threaded first end thereof and disposed within the threaded annular extension of the fixing disk, and a threaded locking ring surrounding the probe and in threaded engagement with the internally threaded annular extension for compressing and circumferentially expanding the first ring into sealing engagement with an exterior surface of the sensing probe; and d) a locking collar for engagement by a second end of the external tube including at least one fluid opening, an outwardly extending hollow post provided with an external threaded portion and an internal threaded portion, the external threaded portion being in threaded engagement with the internally threaded second end of the sensing probe, a second compressible ring disposed within the sensing probe between a head of a threaded bolt and an end of said post; and said threaded bolt being in threaded engagement with the internal threaded portion of the post for compressing and circumferentially expanding the second ring outwardly into sealing engagement with an interior surface of the probe.

2. The level detector of claim 1 wherein the locking ring includes a reduced diameter threaded portion disposed in threaded engagement with the threaded annular extension, and the reduced threaded portion is of a length exceeding the length of the threaded annular extension for permitting the reduced diameter threaded portion to compress and circumferentially expand the first compressible ring.

3. The level detector of claim 1 wherein the threaded bolt includes a threaded portion having an end extending through the locking cover, and a clipping ring secured to the end of the threaded portion.

* * * * *